No. 759,672. PATENTED MAY 10, 1904.
H. CLEMONS.
BICYCLE SEAT POST.
APPLICATION FILED OCT. 22, 1903.
NO MODEL.
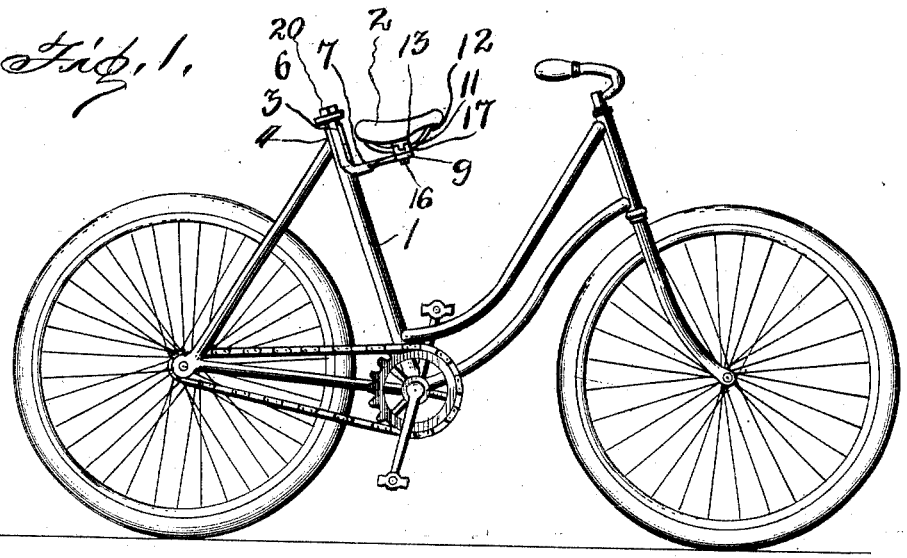
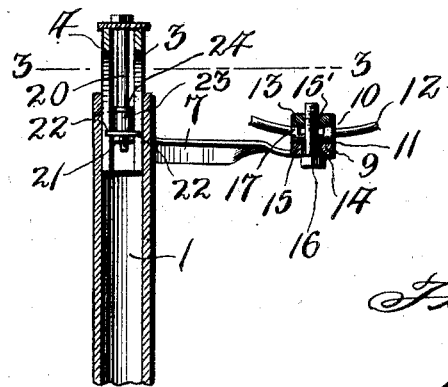
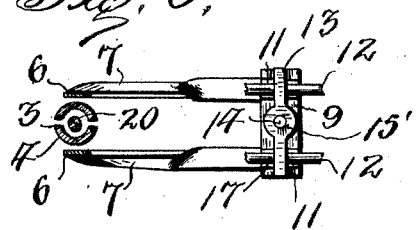
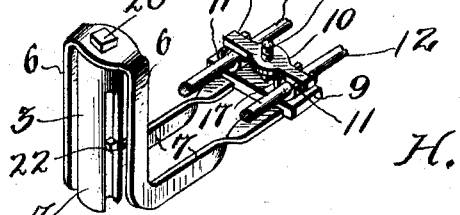
Witnesses
Jas. A. Koehl
Inventor
H. Clemons,
By H. R. Wilson,
Attorney No. 759,672.                                                              Patented May 10, 1904.

UNITED STATES PATENT OFFICE.

HENRY CLEMONS, OF MORRISTOWN, MINNESOTA.

BICYCLE SEAT-POST.

SPECIFICATION forming part of Letters Patent No. 759,672, dated May 10, 1904.

Application filed October 22, 1903. Serial No. 178,074. (No model.)

*To all whom it may concern:*

Be it known that I, HENRY CLEMONS, a citizen of the United States, residing at Morristown, in the county of Rice and State of Minnesota, have invented certain new and useful Improvements in Bicycle Seat-Posts; and I do declare the following to be a full, clear, and exact description of the invention, such as will enable others skilled in the art to which it appertains to make and use the same.

My invention relates to seat-posts for bicycles, more particularly ladies' bicycles.

The object of my invention is to provide a simple, inexpensive, durable, and efficient device of this character which will support a seat below the top of the diagonal or seat-post tube, so that children or persons with short legs may ride upon long-reach bicycles and be comfortably seated with their feet at all times upon the pedals.

With these and other objects in view the invention consists of certain novel features of construction, combination, and arrangement of parts, as will be hereinafter more fully described, and particularly pointed out in the appended claims.

In the accompanying drawings, Figure 1 is a side elevation of a lady's bicycle, showing the application of my invention thereto. Fig. 2 is a detail vertical longitudinal sectional view through a portion of the seat-post tube and my improved seat-post. Fig. 3 is a sectional plan view taken on the line 3 3 of Fig. 2. Fig. 4 is a detail perspective view of the seat-post.

Referring to the drawings by numeral, 1 denote the usual seat-post tube of a lady's bicycle, 2 a seat or saddle of ordinary construction, and 3 my improved seat-post, which supports said seat or saddle at a point below the top of the seat-post tube 1, so as to materially lessen the leg reach of the machine.

The seat-post 3 comprises a tubular rod or post 4, preferably cylindrical in cross-section and adapted to telescope into the seat-post tube 1, in which it is adjustably secured in any desired manner, but preferably by splitting or slotting the lower end of the post and inserting in the same an expanding device 5. Said device comprises a bolt 20, the head of which is upon the outside of the upper end of the post, and its lower screw-threaded end engages a nut 21, having lugs 22, which slide in the slots in said post. An expanding member 23 in the form of a rubber plug is placed upon said bolt between said nut and a fixed collar or washer 24, so that when said bolt is screwed in one direction the rubber will be expanded between the nut and washer to force the split ends of the posts outwardly into frictional engagement with the interior of the post-tube 1, and thus securely clamp the post in position. Upon each side of said post are approximately L-shaped supports comprising arms 6 and 7. The arms 6 are spaced from and lie parallel to the seat-post and have their ends attached to the top of the seat-post. The arms 7 are formed by bending the supports at right angles to the arms 6. Said arms 7 lie parallel to each other in a horizontal plane and have their ends united by a cross piece or bar 9, which forms the lower member of a seat clamp or clutch 10. Said cross-bar is provided at each end directly over the ends of the arms 8 with sockets 11, in which the springs 12 of the seat or saddle 2 are clamped by means of a cross or clamping bar 13, which forms the upper member of the clamp 10. The two members of the clamp are held together by a screw 14, which passes through an opening 15 in the lower member 9 and screws into a threaded opening 15 in the upper member 13. A polygonal head 16 upon said screw permits the clamp to be readily opened or closed. The ends of the cross bar or member 13 fit between the lugs 17, formed by cutting away portions of the socket 11, as clearly shown in Figs. 1 and 4.

The operation and advantages of my invention will be readily understood from the foregoing description, taken in connection with the accompanying drawings. It will be seen that by loosening the bolt 20 the seat-post may be quickly raised or lowered to bring the seat to the desired height, and by loosening the screw 14 the seat or saddle may be tilted to the proper angle.

By the use of my seat-support on a bicycle built for a person with a long leg reach a child may comfortably ride the same and have his feet at all times upon the pedals.

While I have shown the seat-post upon a lady's bicycle, it will be understood that the same may be applied to any bicycle or velocipede when the construction of the same permits of its use.

Various changes in the form, proportion, and the minor details of construction may be resorted to without departing from the principle or sacrificing any of the advantages of this invention.

Having thus described my invention, what I claim, and desire to secure by Letters Patent, is—

1. A bicycle seat-support comprising a rod or post adapted to telescope within a seat-post tube throughout substantially its entire length, downwardly and forwardly extending arms depending from the upper end of said post, and a seat-clamp carried by the forward ends of said arms to support the seat below and forward of the upper end of the seat-post tube.

2. A bicycle seat-support comprising a rod or post adapted to telescope within a seat-post tube throughout substantially its entire length, approximately L-shaped supports depending from the upper end of said post and having one of their arms extending parallel to said post and the other arms projecting forwardly at right angles to said post, and a seat-clamp connecting the outer ends of said arms to support a seat below and forward of the upper end of the seat-post tube, substantially as described.

3. A bicycle seat-post comprising a rod or post, approximately L-shaped supports attached to said post and having one of their arms extending parallel to said post and their other arms projecting at right angles to said post, a cross-bar connecting the outer ends of said arms, sockets upon said cross-bar and provided with guide-lugs, a second cross-bar adapted to seat between said guide-lugs, and a screw for clamping said cross-bars together, substantially as described.

4. The combination with the seat-post tube of a bicycle or the like, of a seat-post adapted to telescope within said seat-post tube throughout substantially its entire length and having means for supporting a seat below the top and in advance of said seat-post tube.

5. A bicycle seat-support comprising a member adapted to telescope within the seat-post tube throughout substantially its entire length, said member having an integral downwardly-extending arm adapted to support a seat below and in advance of the top of the seat-post tube, substantially as described.

6. A bicycle seat-support comprising a rod or post adapted to fit within a seat-post tube, arms connected to the upper end of said post and extending downward in parallel relation to and on opposite sides of said post, said arms being spaced from the post to lie outside the seat-post tube and having forwardly-projecting lower ends, and a seat-clamp carried by said forwardly-projecting lower ends of the arms, to support a seat below and forward of the upper end of the seat-post tube, substantially as described.

7. An adjustable seat-support for bicycles, comprising a post adapted to telescope within a seat-post tube throughout substantially its entire length, a pair of L-shaped arms connected to the top of said tube, said arms having vertical portions arranged on opposite sides of the post and depending from the upper end thereof, and horizontal portions projecting forwardly from the lower ends of said vertical portions, and a seat-clamp upon and connecting the forward ends of said arms to support a seat below and in advance of the upper end of the seat-post tube, substantially as described.

In testimony whereof I have hereunto set my hand in presence of two subscribing witnesses.

HENRY CLEMONS.

Witnesses:
   JOHN WALROD,
   NATHAN A. CADWALLADER.